US010267342B2

(12) United States Patent
Cowie et al.

(10) Patent No.: US 10,267,342 B2
(45) Date of Patent: Apr. 23, 2019

(54) ROTARY ACTUATOR (71) Applicant: Interventek Subsea Engineering Limited, Aberdeen (GB)

(72) Inventors: Gavin David Cowie, Aberdeenshire (GB); John David Sangster, Aberdeen (GB)

(73) Assignee: INTERVENTEK SUBSEA ENGINEERING LIMITED, Aberdeen (GB)

( * ) Notice: Subject to any disclaimer, the term of this patent is extended or adjusted under 35 U.S.C. 154(b) by 67 days.

(21) Appl. No.: 15/317,751

(22) PCT Filed: Jun. 30, 2015

(86) PCT No.: PCT/GB2015/051906
§ 371 (c)(1),
(2) Date: Dec. 9, 2016

(87) PCT Pub. No.: WO2016/001650
PCT Pub. Date: Jan. 7, 2016

(65) Prior Publication Data
US 2017/0114808 A1    Apr. 27, 2017

(30) Foreign Application Priority Data

Jun. 30, 2014  (GB) .................................. 1411639.6
Nov. 4, 2014   (GB) .................................. 1419642.2

(51) Int. Cl.
*F16K 31/12*    (2006.01)
*F15B 15/12*    (2006.01)
(Continued)

(52) U.S. Cl.
CPC .............. *F15B 15/12* (2013.01); *E21B 34/02* (2013.01); *F16K 31/12* (2013.01); *E21B 34/04* (2013.01)

(58) Field of Classification Search
CPC . F16K 31/12; F16K 3/08; F15B 15/12; E21B 34/04; E21B 34/02
(Continued)

(56) References Cited

U.S. PATENT DOCUMENTS 111,513 A * 2/1871 Bromley ................... F16K 3/08
                                                 137/625.31
648,695 A * 5/1900 Krone .................... F16K 31/122
                                                      251/31

(Continued)

FOREIGN PATENT DOCUMENTS

CN    103867518 A    6/2014
DE    4229989 A1     3/1994
(Continued)

OTHER PUBLICATIONS

International Search Report PCT/ISA/210 for International Application No. PCT/GB2015/051906 dated Oct. 13, 2015.
(Continued)

*Primary Examiner* — Umashankar Venkatesan
(74) *Attorney, Agent, or Firm* — Harness, Dickey & Pierce, P.L.C.

(57) ABSTRACT

A rotary actuator comprises a rotatable vane assembly mounted within a housing to define first and second chambers, wherein the rotatable vane assembly is rotatable between first and second positions. A first fluid port is in communication with the first chamber to permit an actuation fluid to be delivered to/from the first chamber, and a second fluid port is in communication with the second fluid chamber to permit actuation fluid to be delivered to/from the second fluid chamber. A sealing arrangement is provided for sealing at least one of the first and second fluid ports when the vane assembly is located in one or both of its first and second positions.

26 Claims, 5 Drawing Sheets (51) Int. Cl.
*E21B 34/02* (2006.01)
*E21B 34/04* (2006.01)

(58) Field of Classification Search
USPC .......................................................... 251/59
See application file for complete search history.

(56) References Cited

U.S. PATENT DOCUMENTS

| | | | | |
|---|---|---|---|---|
| 2,435,968 | A * | 2/1948 | Kalix | G05D 7/0193 |
| | | | | 137/502 |
| 2,451,689 | A * | 10/1948 | Nelson | B62D 5/14 |
| | | | | 137/106 |
| 2,569,640 | A * | 10/1951 | Mercier | F03C 4/00 |
| | | | | 235/61 PL |
| 2,735,406 | A * | 2/1956 | Britton | F15B 9/10 |
| | | | | 91/210 |
| 2,781,027 | A * | 2/1957 | Henry | F15B 15/12 |
| | | | | 92/122 |
| 2,890,889 | A * | 6/1959 | Work | B23B 31/16025 |
| | | | | 279/114 |
| 3,017,807 | A * | 1/1962 | Grover | F15B 15/12 |
| | | | | 188/134 |
| 3,053,236 | A * | 9/1962 | Self | B64C 13/24 |
| | | | | 277/345 |
| 3,207,047 | A * | 9/1965 | O'Connor | F15B 15/12 |
| | | | | 92/124 |
| 3,456,562 | A * | 7/1969 | Hansen | F15B 15/12 |
| | | | | 92/122 |
| 3,528,384 | A * | 9/1970 | Lechner | G01P 13/0026 |
| | | | | 116/269 |
| 4,375,239 | A | 3/1983 | Barrington et al. | |
| 4,825,754 | A * | 5/1989 | Devaud | F15B 9/10 |
| | | | | 92/122 |
| 5,284,209 | A | 2/1994 | Godfrey | |
| 5,700,027 | A | 12/1997 | Schiffler | |
| 6,830,073 | B2 * | 12/2004 | Lee | F15B 13/0406 |
| | | | | 137/625.43 |
| 7,419,134 | B2 * | 9/2008 | Gruel | F16K 31/105 |
| | | | | 251/30.01 |
| 8,240,242 | B2 * | 8/2012 | Rys | F15B 15/12 |
| | | | | 92/122 |
| 2001/0018864 | A1 | 9/2001 | Hirano et al. | |
| 2010/0064885 | A1 * | 3/2010 | Werkhoven | F15B 1/12 |
| | | | | 92/121 |
| 2013/0103208 | A1 | 4/2013 | Niemeyer et al. | |
| 2014/0238231 | A1 | 8/2014 | Kim et al. | |

FOREIGN PATENT DOCUMENTS

| | | |
|---|---|---|
| GB | 1523804 A | 9/1978 |
| GB | 2334758 A | 9/1999 |
| WO | WO-2011/041550 A2 | 4/2011 |
| WO | WO-2014/065995 A1 | 5/2014 |
| WO | WO-2014/116577 A1 | 7/2014 |

OTHER PUBLICATIONS

Written Opinion of the International Searching Authority PCT/ISA/237 for International Application No. PCT/GB2015/051906 dated Oct. 15, 2015.
Great Britain Search Report for Great Britain Application No. GB1419642.2 dated Apr. 23, 2015.
Great Britain Search Report for Great Britain Application No. GB1411639.6 dated Dec. 10, 2014.

* cited by examiner

ROTARY ACTUATOR

CROSS-REFERENCE TO RELATED APPLICATIONS

This application is the U.S. National Phase application of PCT Application No. PCT/GB2015/051906 filed on Jun. 30, 2015, which claims priority to Great Britain Patent Application No. 1411639.6 filed on Jun. 30, 2014 and Great Britain Patent Application No. 1419642.2 filed on Nov. 4, 2014, the entire contents of each of which are incorporated herein by reference.

FIELD

The present invention relates to a rotary actuator for use in providing a rotary drive output.

BACKGROUND

Many mechanisms require a form of rotary drive for operation, such as some valves, for example ball valves. Many drive or actuator systems exist which are capable of generating a rotary drive force or torque to be applied to a mechanism. For example, it is known to utilise a linear actuator, such as a linear piston, in combination with a suitable movement translator, such as a crank system, to convert the linear movement to rotation. However, the requirement for a suitable movement translator may add to the complexity of the actuator, with the added potential for failure.

It is known in the art to utilise direct rotary drive systems, such as rotary pistons, to provide a rotary drive force. However, such systems may include complexities of maintaining internal sealing during operation.

SUMMARY

An aspect of the present invention relates to a rotary actuator, comprising:
- a housing;
- a rotatable vane assembly mounted within the housing to define first and second chambers, wherein the rotatable vane assembly is rotatable between first and second positions;
- a first fluid port in communication with the first chamber to per an actuation fluid to be delivered to/from the first chamber;
- a second fluid port in communication with the second fluid chamber to permit actuation fluid to be delivered to/from the second fluid chamber; and
- a sealing arrangement for sealing at least one of the first and second fluid ports when the vane assembly is located in one or both of its first and second positions.

In use, the rotary actuator may function by rotation of the rotatable vane assembly within the housing between the first and second positions. This rotation may correspond to a rotary drive output from the rotatable vane assembly, which output may be used to provide useful work. Rotation may be achieved by controlling the flow of actuation fluid to/from the first and second chambers via the first and second fluid ports. For example, when the actuation fluid is driven, for example under pressure, into the first chamber, actuation fluid may be simultaneously vented from the second chamber, and vice versa. Increasing the fluid pressure in one chamber relative to the other may establish a pressure differential across the vane on the rotatable vane assembly, which allows the rotatable vane assembly to rotate between its first and second positions.

The sealing arrangement may function to minimise fluid leakage between the first and second chambers when the vane assembly is in either its first or second position. That is, if either the first or second fluid ports are sealed then any flow path which might otherwise exist is eliminated, minimising the risk of fluid migration within the housing.

When the vane assembly is in either the first or second position, the sealing arrangement may assist to maintain the pressure of the actuation fluid in the associated chambers. This may assist to maintain the vane assembly in position without inadvertent movement due to leakage from or between the first and second chambers. This may minimise the requirements to continuously operate a pressure device, such as a pump, for example to continuously replenish and maintain pressure within one of both of the first and second chambers.

Furthermore, the ability to establish sealing when the vane assembly is located at either its first and second position may minimise the requirement for complete or substantially complete sealing across the vane assembly between the first and second chambers.

The rotary actuator may be used in any application where a rotary drive output is required. The rotary actuator may be used in combination with, for example, a valve such as a ball valve. The rotary actuator may be useful in environments where space is at a premium such in oil and gas environments, for example offshore, subsea environments and the like.

The rotary actuator may be used in or form part of a subsea landing string assembly. The rotary actuator may be used within a tubular body, such as a riser. The rotary actuator may form part of a safety apparatus or system, for example in an oil and gas environment. The rotary actuator may be for use in operating or actuating a valve within a Subsea Test Tree (SSTT).

The housing may comprise an external wall structure. The external wall structure may facilitate interaction with other equipment or structures.

The housing may comprise an internal support structure. The internal support structure may support one or more internal components such as the rotatable vane assembly. The internal support structure may support the valve assembly during rotation thereof. The housing may comprise a single internal support structure. In some embodiments the housing may comprise multiple, for example two, internal support structures. Multiple support structures may facilitate support of components, such as the vane assembly, at multiple points.

The housing may comprise a shaft member for use in supporting, for example rotatably supporting the vane assembly.

The housing may comprise a bush structure for supporting, for example rotatably supporting the vane member.

The first and second positions of the vane assembly may define limit positions of movement of the vane assembly within the housing.

The vane assembly may move less than 360 degrees of revolution to move between its first and second positions. In such an arrangement the actuator may define a partial turn rotary actuator.

When the vane assembly is in its first position the first chamber may define a minimum chamber volume while the second chamber may define a maximum chamber volume. In some embodiments when the vane assembly is in its first position the first chamber may define a substantially zero volume. That is, the first chamber may be entirely closed when the vane assembly is in its first position.

When the vane assembly is in its second position the second chamber may define a minimum chamber volume while the first chamber may define a maximum chamber volume. In some embodiments when the vane assembly is in its second position the second chamber may define a substantially zero volume. That is, the second chamber may be entirely closed when the vane assembly is in its second position.

The first fluid port may be sealed when the vane assembly is located within its first position. The second fluid port may be sealed when the vane assembly is located within its second position.

The first fluid port may be occluded when the vane assembly is in its first position. Such occlusion may provide or assist to provide sealing of the first fluid port. The second fluid port may be occluded when the vane assembly is in its second position. Such occlusion may provide or assist to provide sealing of the second fluid port.

The first fluid port may be provided in one of the housing and the vane assembly. In one embodiment the first fluid port may be provided in the housing.

The second fluid port may be provided in one of the housing and the vane assembly. In one embodiment the second fluid port may be provided in the housing.

The housing may comprise or define first and second limit surfaces. The first limit surface may define a wall surface or boundary of the first chamber. The second limit surface may define a wall surface or boundary of the second chamber.

The vane assembly may comprise a vane member.

When the vane assembly is in its first position the vane member may engage the first limit surface. Engagement of the vane member and the first limit surface may assist to facilitate sealing of the first fluid port.

When the vane assembly is in its second position the vane member may engage the second limit surface. Engagement of the vane member and the second limit surface may assist to facilitate sealing of the second fluid port.

In some embodiments each limit surface may be mounted on the same or separate support structures within the housing.

The first fluid port may be provided in the first limit surface.

The second fluid port may be provided in the second limit surface.

One or both of the first and second limit surfaces may be profiled to cooperate with a profile of the vane member.

One or both of the first and second limit surfaces may be flat or substantially flat, for example planar or substantially planar. One or both of the first and second limit surfaces may have curved or angular surfaces.

The vane member may comprise opposing first and second vane surfaces. The first vane surface may define a wall surface or boundary, for example a moving boundary, of the first chamber. The second vane surface may define a wall surface or boundary, for example a moving boundary, of the second chamber.

When the vane assembly is in its first position the first vane surface may engage a region or portion within the housing, for example the first limit surface within the housing. Engagement of the first vane surface with a region or portion within the housing may assist to facilitate sealing of the first fluid port.

When the vane assembly is in its second position the second vane surface may engage a region or portion within the housing, for example the second limit surface within the housing. Engagement of the second vane surface with a region or portion within the housing may assist to facilitate sealing of the second fluid port.

The first fluid port may be provided in the first vane surface.

The second fluid port may be provided in the second vane surface.

One or both of the first and second vane surfaces may be profiled to cooperate with a profile of a respective limit surface.

One or both of the first and second vane surfaces may be flat or substantially flat, for example planar or substantially planar. One or both of the first and second vane surfaces may have curved or angular surfaces.

The first and second vane surfaces may be defined as pressure surfaces in that fluid pressure within the respective first and second chambers may be applied over the first and second vane surfaces to cause rotation of the vane assembly.

The housing may comprise several parts. Such parts may fit together to form the complete housing. The parts may allow the housing to be disassembled or reassembled. The parts may allow the housing to be installed more easily. The parts may allow easier access to internal components of the rotary actuator.

The housing may comprise a body portion defining a cavity which is configured to receive the rotary vane assembly. The housing may comprise a cover arranged to be secured to the body portion to encase the vane assembly and other internal components.

The rotary actuator may comprise a biasing arrangement for biasing the rotatable vane assembly in a preferred direction. The rotatable vane assembly may comprise a central hub. The vane assembly may be rotatable about a central rotation axis which extends through the hub. The hub may be rotatably supported within the housing. For example, the hub may be rotatably supported on a support structure within the housing, such as a shaft, bush or the like.

The vane member may be supported by the hub. The vane member may extend or protrude, for example radially extend from the hub. Surfaces of the vane, for example the first and second opposing vane surfaces may extend perpendicular to or at an acute/obtuse angle to the central hub.

The vane member may be integrally formed with the hub. Alternatively, the vane member may be separately formed and secured to the hub.

The vane member may be coupled or otherwise secured or formed with the hub to facilitate torque to be transferred to the hub.

The vane member may comprise a base section which is secured or otherwise formed with the central hub. The vane member may comprise a tip section. The first and second opposing vane faces of the vane member may extend from the base section to the tip section. The vane may be thicker at the base than at the tip. Alternatively, the tip may be thicker than the base. Alternatively further, the vane may define a uniform thickness from base to tip.

The radial cross section of the vane may be the same or substantially the same from the base to the tip. The radial cross section of the vane may vary from the base to the tip. The radial cross sectional shape of the vane may be of the same shape or the same general shape from base to tip, but of varying area. The radial cross section of the vane may change shape, area or both from base to tip.

The vane may taper from base to tip. The taper may be linear. The taper may be non-linear. The taper may be a combination of both linear and non-linear.

The vane may be configured to be fitted sufficiently close to a surface of the housing to minimise a clearance gap therebetween.

The sealing arrangement may comprise a static sealing arrangement. The static sealing arrangement may be configured to restrict the flow of actuation fluid between a chamber and an associated fluid port.

The static sealing arrangement may only provide an effective seal when the rotatable vane assembly is in either of its first or second positions.

As a static seal may only be effective when the vane assembly is in either its first or second position, this may be useful for providing an indication of the status of the valve.

For example, if flow of actuation fluid through the valve is not possible, a controller may recognise that it may be in either its first or second positions.

The static sealing arrangement may be configured to seal around a periphery of one of the first and second fluid ports.

The static sealing arrangement may be mounted on the vane member and configured to be engaged with a sealing surface within the housing, for example with sealing surface formed on a limit surface.

The static sealing arrangement may be mounted on a surface of the housing, for example a limit surface of the housing. In such an arrangement the static sealing arrangement may be engaged with the vane assembly when said vane assembly is located in one of its first and second positions.

The sealing arrangement may comprise a first static sealing arrangement associated with the first fluid port, and a second static sealing arrangement associated with the second fluid port. In such an arrangement a static seal may be established when the vane assembly is in both its first and second positions.

The sealing arrangement may comprise a seal member, such as an elastomer member, plastic member, metal member or the like. The seal member may be defined by an O-ring, for example.

The sealing arrangement may comprise a seal coating, such as an elastomer coating, which covers a respective fluid port to provide sealing.

The rotary actuator may comprise a secondary sealing arrangement. The secondary sealing arrangement may be provided to establish sealing between relatively moving parts within the rotary actuator. For example, the secondary sealing arrangement may define a dynamic sealing arrangement.

A dynamic seal may be situated between any surfaces that move relative to one another.

A dynamic seal may be configured to seal around peripheral surfaces of the vanes, such as those that are adjacent to the housing. Peripheral surfaces of the vanes may include a tip surface and a side surface or surfaces. A dynamic seal may also be configured to seal around the surfaces of the central hub which are adjacent to a wall of the housing. A dynamic seal may further be configured to seal around the surfaces of the central hub which are adjacent to the support structure of the central housing.

In some cases, a degree of leakage through the dynamic sealing arrangement may be acceptable.

The dynamic seal may be mounted to a component of the rotary actuator by any appropriate means such as chemical bonding or matable engagement into a geometric feature.

The dynamic sealing arrangement may provide an effective seal regardless of the position of the vane.

The secondary sealing arrangement may comprise a seal coating, such as an elastomer coating, to enable it to provide an effective dynamic seal.

The rotatable vane assembly may comprise a single vane member.

The rotatable vane assembly may comprise more than one vane member. Multiple vane members may facilitate a torque multiplier to be achieved within the actuator.

Each vane member may cooperate with the housing to define pairs of chambers, wherein each chamber may include an associated fluid port. For example, a first vane member may define first and second chambers having respective first and second fluid ports. A second vane member may define third and fourth chambers having respective third and fourth fluid ports. The sealing arrangement may provide appropriate sealing of one, some or all fluid ports. In such an embodiment a first limit surface may be provided for engaging the first vane member and a third limit surface may be provided for engaging the second vane member when the vane assembly is in its first position. Similarly, a second limit surface may be provided for engaging the first vane member and a fourth limit surface may be provided for engaging the second vane member when the vane assembly is in its second position.

In one embodiment multiple vane members may be evenly circumferentially distributed about the vane assembly, for example about a central hub.

In one embodiment the vane assembly may comprise at least one pair of diametrically opposed vane members.

The rotary actuator may comprise respective fluid conduits for delivering fluid to/from the chambers.

The rotary actuator may comprise a drive construction to facilitate connection and actuation of an external device. The drive construction may comprise a shaft, for example.

The housing may define a geometry which facilitates connection or integration with a separate external device.

At least a portion of the housing may be integrated with or form part of another device, for example the wall of a Subsea Test Tree (SSTT).

The fluid ports may be positioned such that they are always in communication with the same chamber, regardless of the position of the rotatable vane assembly. Alternatively, the fluid ports may be positioned such that they may be in contact with differing chambers depending on the position of the rotatable vane assembly.

The fluid ports may have a cross section which is circular, oval, polygonal, irregular or a combination of these shapes.

An aspect of the present invention relates to a method for actuation, comprising:
  delivering an actuation fluid via a first fluid port into a first chamber provided on one side of a vane member of a vane assembly to rotate said vane assembly from a first position within a housing;
  permitting actuation fluid to vent via a second fluid port from a second chamber provided on an opposing side of the vane member during rotation of the vane assembly from the first position; and
  sealing the second fluid port when the vane assembly is rotated to a second position.

The method may be performed using a rotary actuator according to any other aspect.

An aspect of the present invention relates to a valve assembly comprising:
  a valve member; and
    a rotary actuator comprising:
    a housing;

a rotatable vane assembly mounted within the housing to define first and second chambers, wherein the rotatable vane assembly is rotatable between first and second positions;

a first fluid port in communication with the first chamber to permit an actuation fluid to be delivered to/from the first chamber;

a second fluid port in communication with the second fluid chamber to permit actuation fluid to be delivered to/from the second fluid chamber; and a sealing arrangement for sealing at least one of the first and second fluid ports when the vane assembly is located in one or both of its first and second positions, wherein the valve member is coupled to the rotatable vane assembly.

The valve assembly may define or form part of a SSTT in a landing string.

Features defined in relation to one aspect may be provided in combination with any other aspect.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
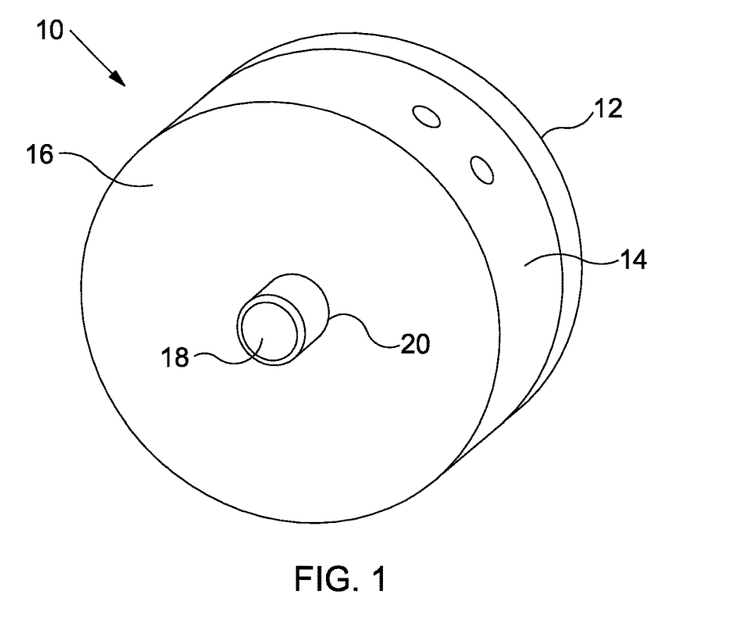
FIG. 1 is a perspective view of a rotary actuator in accordance with an embodiment of the present invention.

FIG. 1 is a perspective view of a rotary actuator, generally identified by reference numeral 10, in accordance with an embodiment of the present invention. The rotary actuator 10 is illustrated as a stand-alone component. However, in some embodiments the actuator 10 may be attached to or integrated with a separate external device.

The actuator 10 includes a housing 12 which, in the present embodiment, includes a generally cylindrical body portion 14 and a cover 16. A shaft 18 extends from the housing 12 of the actuator 10, specifically through an aperture 20 in the housing cover 16. The shaft may provide a rotary output from the actuator 10 to be coupled to a system or mechanism requiring the rotary drive.

Figure 2:
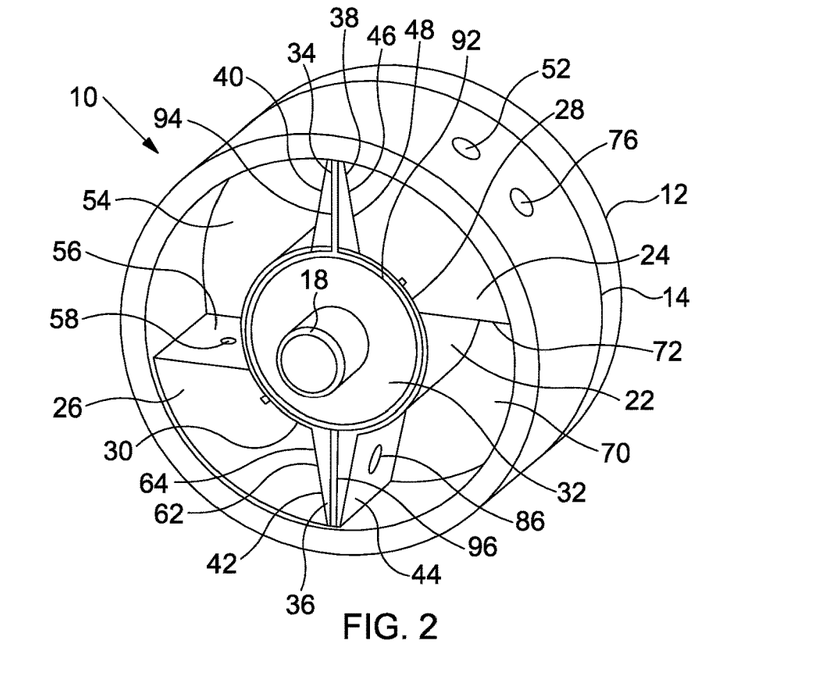
FIG. 2 illustrates the rotary actuator of FIG. 1 with a housing cover removed and a rotatable vane assembly in a first position.
Figure 3:
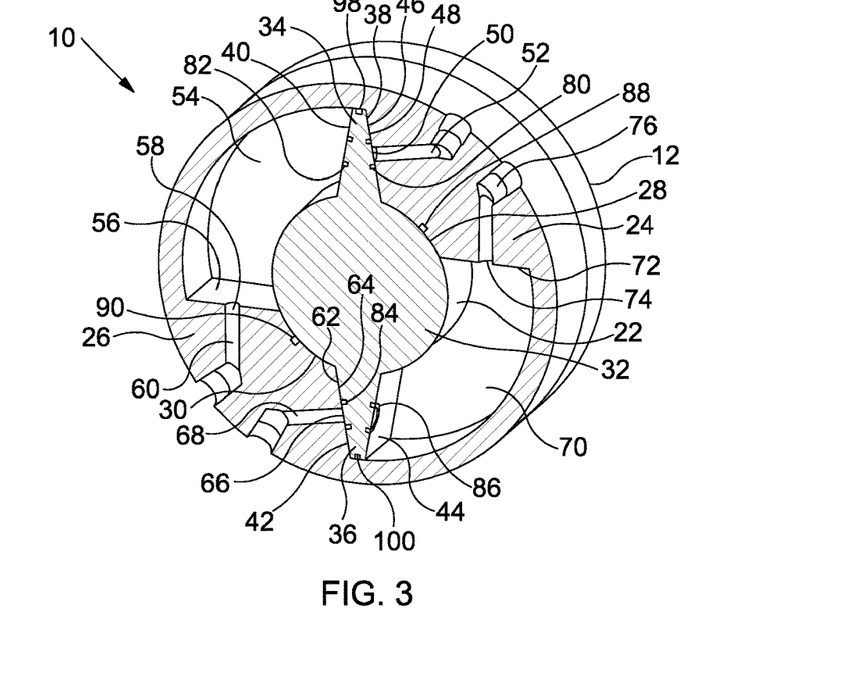
FIG. 3 is a cross sectional view taken along a lateral plane of the rotary actuator.

Reference is now made to FIGS. 2 and 3, in which FIG. 2 illustrates the rotary actuator 10 of FIG. 1 with the cover 16 removed, and FIG. 3 is a cross-sectional view of the actuator 10 taken through a lateral plane. The rotary actuator 10 includes a rotatable vane assembly 22 which is rotatably supported within the housing 12 via diametrically opposed first and second support structures 24, 26. The support structures 24, 26 are integral with the housing 12 and each include inner curved bush/bearing surfaces 28, 30 which act to engage and rotatably support the vane assembly 22. The vane assembly 22 is shown in a first position in FIGS. 2 and 3.

The rotatable vane assembly 22 comprises a central hub 32 which supports the shaft 18 and first and second diametrically opposed vanes 34, 36 which radially extend from the central hub 32. The first vane 34 includes first and second opposing vane surface 38, 40, and the second vane 36 includes third and fourth opposing vane surfaces 42, 44. In other embodiments a single vane, or more than two vanes may be provided and spaced in other formations including even and uneven spacing.

A first chamber 46 is defined between the first vane surface 38 of the first vane 34 and the first support structure 24, specifically a first limit surface 48 of the first support structure 24. In FIGS. 2 and 3 with the vane assembly 22 in its first position the first chamber 46 is closed. A first fluid port 50 (FIG. 3) is provided in the first limit surface 48 to facilitate transfer of an actuation fluid to/from the first chamber 46. A conduit 52 is provided in the housing 12 to permit communication of a source of actuation fluid (not shown) with the first fluid port 50.

A second chamber 54 is defined between the second vane surface 40 of the first vane 34 and the second support structure 26, specifically a second limit surface 56 of the second support structure 26. In FIGS. 2 and 3 with the vane assembly 22 in its first position the second chamber 54 is fully open. A second fluid port 58 is provided in the second limit surface 56 to facilitate transfer of an actuation fluid to/from the second chamber 54. A conduit 60 (FIG. 3) is provided in the housing 12 to permit communication of a source of actuation fluid (not shown) with the second fluid port 58.

A third chamber 62 is defined between the third vane surface 42 of the second vane 36 and the second support structure 26, specifically a third limit surface 64 of the second support structure 26. In FIGS. 2 and 3 with the vane assembly 22 in its first position the third chamber 62 is closed. A third fluid port 66 (FIG. 3) is provided in the third limit surface 64 to facilitate transfer of an actuation fluid to/from the third chamber 62. A conduit 68 (FIG. 3) is provided in the housing 12 to permit communication of a source of actuation fluid (not shown) with the third fluid port 66.

A fourth chamber 70 is defined between the fourth vane surface 44 of the second vane 36 and the first support structure 24, specifically a fourth limit surface 72 of the first support structure 24. In FIGS. 2 and 3 with the vane assembly 22 in its first position the fourth chamber 70 is fully open. A fourth fluid port 74 (FIG. 3) is provided in the fourth limit surface 72 to facilitate transfer of an actuation fluid to/from the fourth chamber 70. A conduit 76 is provided in the housing 12 to permit communication of a source of actuation fluid (not shown) with the fourth fluid port 74.

The actuator 10 includes a static sealing arrangement which includes a number of O-ring seals mounted on the vane surfaces 38, 40, 42, 44 and arranged to selectively seal the fluid ports 50, 58, 66, 74. Specifically, a first O-ring seal 80 is mounted on the first vane face 38, a second O-ring seal 82 is mounted on the second vane face 40, a third O-ring seal 84 is mounted on the third vane face 42, and a fourth O-ring seal 86 is mounted on the fourth vane face 44.

The actuator 10 further comprises a dynamic sealing arrangement which includes a number of seals arranged to minimise leakage of actuation fluid between relatively moving parts of the actuator 10. In the embodiment shown the actuator 10 includes first and second hub seal 88, 90 configured to provide dynamic sealing between the hub 32 of the vane assembly 22 and the respective support structures 24, 26. Additionally, a circumferential seal 92 (FIG. 2) is provided around the circumference of the hub 32, and respective radial seals 94, 96 (FIG. 2) are provided on the vane members 34, 36. Also, respective vane tip seals 98, 100 (FIG. 3) are provided on the tip of each vane member 34, 36.

In use, the vane assembly 22 may be initially located in its first position, as shown in FIGS. 2 and 3, with the first face 38 of the first vane member 34 in engagement with the first limit face 46, and similarly with the third face 42 of the second vane member 36 in engagement with the third limit face 64. When in this position the first O-ring seal 80 provides a static seal around the first fluid port 50, and the third O-ring seal 84 provides a static seal around the third fluid port 66. With such static seals established, any potential flow path for the actuation fluid is blocked, thus effectively preventing or minimising the capability for fluid leakage between individual chambers, which might otherwise result in inadvertent rotation of the vane assembly 22.

Figure 4:
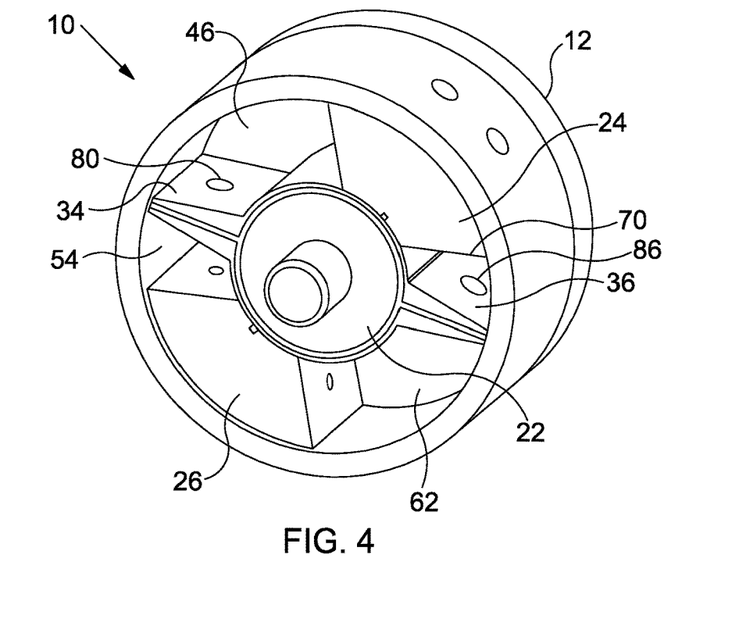
FIG. 4 illustrates the rotatable vane assembly in a mid-stroke position.

When rotation of the vane assembly 22 is required actuation fluid may be driven under pressure into the first and third chambers 46, 62 via respective ports 50, 66, with fluid permitted to be vented from the second and fourth chambers 54, 70 via respective ports 58, 74. This fluid control causes the vane assembly 22 to rotate, as shown in FIG. 4. By utilising multiple vane members the output torque at the shaft 18 may be increased for the same actuation pressure.

Figure 5:
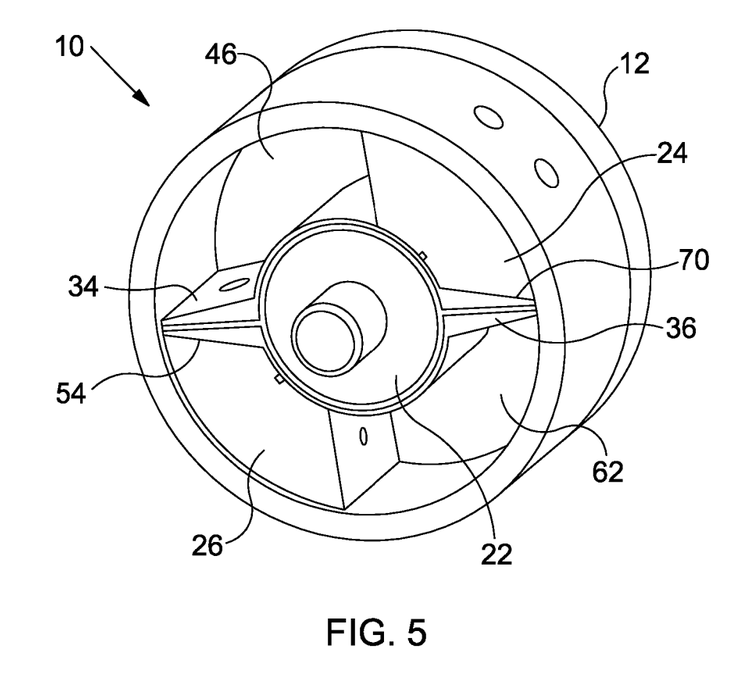
FIG. 5 illustrates the rotatable vane assembly in a second position.

Continued rotation of the vane assembly 22 will eventually cause this to reach a second position, as shown in FIG. 5, in which the second vane face 40 of the first vane member 34 engages the second limit surface 56 of the second support structure 26, and the fourth vane face 44 of the second vane member 36 engages the fourth limit surface 72 of the first support structure 24. When in this second position the second and fourth O-rings 82, 86 (FIG. 3) establish static seals around the respective second and fourth ports 58, 74, again providing advantages in terms of minimising leakage of the actuation fluid, assisting to maintain the vane assembly 22 in position.

Embodiments of the rotary actuator of the present invention may be used in any application where a rotary drive is required. One example use will now be described.

Figure 6:
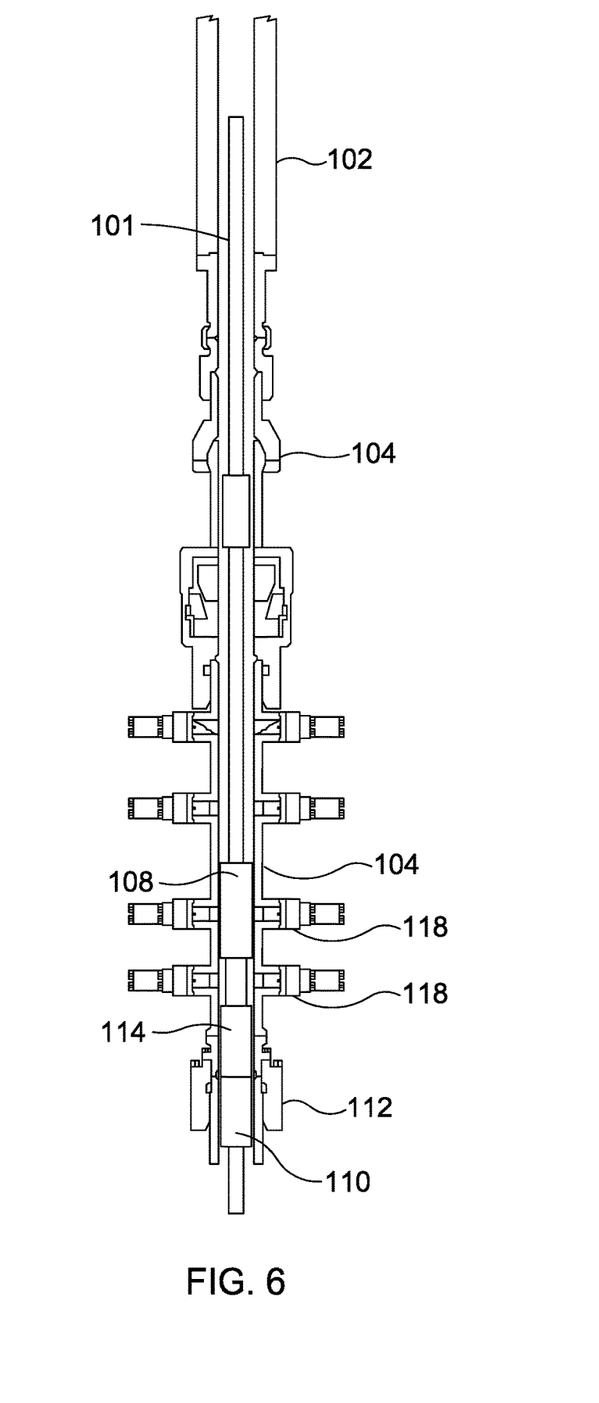
FIG. 6 is an example of a landing string in which the rotary actuator may be used.

FIG. 6 illustrates a landing string assembly 101 extended through a marine riser 102 and a Blow Out Preventor (BOP) stack 104, wherein the riser 102 is secured to the BOP stack 104 via flex joint 106. The landing string 101 includes a Subsea Test Tree (SSTT) 108 which as noted below may include one or more rotary actuators according to the present invention. The landing string 101 further includes a tubing hanger 110 which facilitates coupling with a wellhead 112. A tubing hanger running tool 114 may also be provided to run the landing string 101 to the wellhead 114 along the marine riser 102.

Between the SSTT 108 and the tubing hanger 110 and running tool 112 is a slick joint 116 having a smooth outer surface against which a pipe ram 118 of the BOP stack 104 can form a seal in case of emergency.

Figure 7:
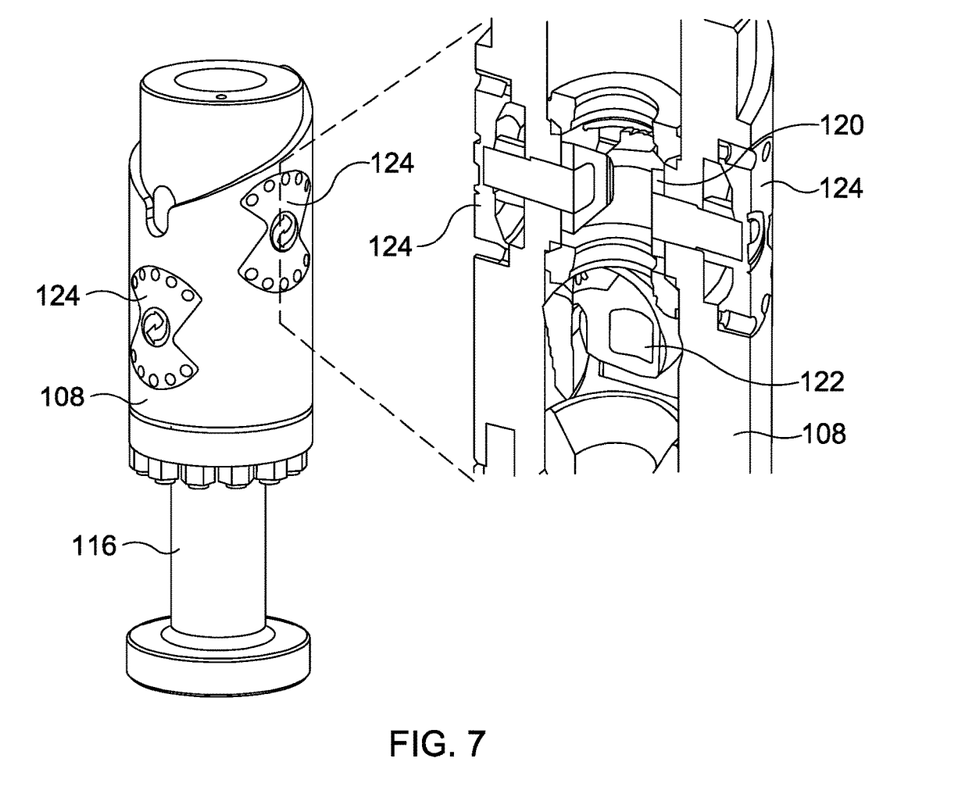
FIG. 7 shows an example of a SSTT and integrated rotary actuator.

FIG. 7 shows a perspective view of the SSTT 108 and slick joint 116 of FIG. 6 shown in isolation form the remainder of the landing string 101. In the present example the SSTT 108 includes dual ball valves 120, 122, wherein each ball valve 120, 122 is secured to a pair of rotary actuators 124, provided in accordance with an embodiment of the present invention. For example, rotary actuators 124 may be provided substantially in the form of the rotary actuator 10 first shown in FIG. 1.

It should be understood that the embodiments described herein are merely exemplary and that various modifications may be made thereto without departing from the scope of the present invention.

The invention claimed is:

1. A rotary actuator, comprising:
a housing;
a rotatable vane assembly mounted within the housing to define first and second chambers, the first chamber including a first limit surface defining a boundary of the first chamber and the second chamber including a second limit surface defining a boundary of the second chamber, wherein the rotatable vane assembly is rotatable between first and second positions, and wherein in the first position the rotatable vane assembly engages the first limit surface, and in the second position the rotatable vane assembly engages the second limit surface;
a first fluid port on the first limit surface and in communication with the first chamber to permit an actuation fluid to be delivered to/from the first chamber;
a second fluid port on the second limit surface in communication with the second chamber to permit actuation fluid to be delivered to/from the second chamber; and
a static seal member on one of the rotatable vane assembly and the second limit surface configured to seal second fluid port when the rotatable vane assembly is located in the second position.

2. The rotary actuator according to claim 1, wherein the housing comprises an internal support structure for supporting the rotatable vane assembly during rotation thereof.

3. The rotary actuator according to claim 1, wherein the housing comprises a shaft member for use in rotatably supporting the rotatable vane assembly.

4. The rotary actuator according to claim 1, wherein the housing comprises a bush structure for rotatably supporting the rotatable vane assembly.

5. The rotary actuator according to claim 1, wherein the first and second positions of the rotatable vane assembly define limit positions of movement of the rotatable vane assembly within the housing.

6. The rotary actuator according to claim 1, wherein when the rotatable vane assembly is in the first position, the first chamber defines a minimum chamber volume and the second chamber defines a maximum chamber volume.

7. The rotary actuator according to claim 1, wherein when the rotatable vane assembly is in the second position, the first chamber defines a maximum chamber volume and the second chamber defines a minimum chamber volume.

8. The rotary actuator according to claim 1, wherein the first fluid port is sealed when the rotatable vane assembly is in the first position.

9. The rotary actuator according to claim 1, wherein the first and second fluid ports are provided in the housing.

10. The rotary actuator according to claim 1, wherein engagement of the rotatable vane assembly and the first limit surface facilitates sealing of the first fluid port.

11. The rotary actuator according to claim 1, wherein the rotatable vane assembly comprises a vane member.

12. The rotary actuator according to claim 11, wherein the vane member is mounted on a hub, and the rotatable vane assembly is rotatable about a central rotation axis which extends through the hub.

13. The rotary actuator according to claim 12, wherein the hub is rotatably supported within the housing.

14. The rotary actuator according to claim 11, wherein the vane member comprises opposing first and second vane surfaces, the first vane surface defining a wall surface of the first chamber and the second vane surface defining a wall surface of the second chamber.

15. The rotary actuator according to claim 14, wherein when the rotatable vane assembly is in the first position, the first vane surface engages a region or portion within the housing, and when the rotatable vane assembly is in the second position the second vane surface engages a region or portion within the housing.

16. The rotary actuator according to claim 14, wherein the first and second vane surfaces define pressure surfaces such that fluid pressure within the respective first and second chambers applied over the first and second vane surfaces causes rotation of the rotatable vane assembly.

17. The rotary actuator according to claim 11, wherein the rotatable vane assembly comprises more than one vane member.

18. The rotary actuator according to claim 17, wherein each vane member cooperates with the housing to define pairs of chambers, wherein each chamber include an associated fluid port, wherein the static seal provides selective sealing of some of the first and second fluid ports.

19. The rotary actuator according to claim 17, wherein the rotatable vane assembly comprises at least one pair of diametrically opposed vane members.

20. The rotary actuator according to claim 1, wherein the static seal is configured to seal around a periphery of one of the first and second fluid ports.

21. The rotary actuator according to claim 1, wherein the static seal is mounted on the rotatable vane assembly and configured to be engaged with a sealing surface within the housing.

22. The rotary actuator according to claim 1, wherein the static seal comprises a first static sealing arrangement associated with the first fluid port, and a second static sealing arrangement associated with the second fluid port.

23. The rotary actuator according to claim 1, comprising a secondary sealing arrangement configured to establish sealing between relatively moving parts within the rotary actuator.

24. The rotary actuator according to claim 1, comprising a drive construction to facilitate connection and actuation of an external device.

25. A method for actuation, comprising:
    delivering an actuation fluid via a first fluid port into a first chamber provided on one side of a vane member of a rotatable vane assembly to rotate said vane assembly from a first position within a housing, the first chamber including a first limit surface defining a boundary of the first chamber and the first fluid port being provided on the first limit surface;
    permitting actuation fluid to vent via a second fluid port from a second chamber provided on an opposing side of the vane member during rotation of the rotatable vane assembly from the first position, the second chamber including a second limit surface defining a boundary of the second chamber and the second fluid port being provided on the second limit surface; and
    sealing the second fluid port with a static sealing arrangement mounted on one of either the rotatable vane assembly or the second limit surface when the rotatable vane assembly is rotated to a second position.

26. A valve assembly comprising:
    a valve member; and
    a rotary actuator
    according to claim 1,
    wherein the valve member is coupled to the rotatable vane assembly of the rotary actuator.

* * * * *